United States Patent
Roberts et al.

(10) Patent No.: US 9,755,964 B2
(45) Date of Patent: Sep. 5, 2017

(54) MULTI-PROTOCOL HEADER GENERATION SYSTEM

(71) Applicant: Advanced Micro Devices, Inc., Sunnyvale, CA (US)

(72) Inventors: David A. Roberts, Sunnyvale, CA (US); Michael Ignatowski, Austin, TX (US); Nuwan Jayasena, Sunnyvale, CA (US); Gabriel H. Loh, Bellevue, WA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 43 days.

(21) Appl. No.: 14/859,844

(22) Filed: Sep. 21, 2015

(65) Prior Publication Data

US 2017/0085472 A1    Mar. 23, 2017

(51) Int. Cl.
*H04L 12/40* (2006.01)
*H04L 12/781* (2013.01)
*H04L 29/06* (2006.01)
*H04L 12/715* (2013.01)
*H04L 12/861* (2013.01)

(52) U.S. Cl.
CPC .............. *H04L 45/52* (2013.01); *H04L 45/04* (2013.01); *H04L 49/9057* (2013.01); *H04L 69/08* (2013.01)

(58) Field of Classification Search
None
See application file for complete search history.

(56) References Cited

U.S. PATENT DOCUMENTS

| | | | | |
|---|---|---|---|---|
| 7,584,317 B2 * | 9/2009 | Sakai | ...................... | H04L 69/12 455/422.1 |
| 2002/0015442 A1 * | 2/2002 | Takeuchi | ......... | H04N 21/23608 375/211 |
| 2004/0008713 A1 * | 1/2004 | Knight | .................... | G06F 13/28 370/428 |
| 2004/0203709 A1 * | 10/2004 | Luneau | .................. | H04L 69/08 455/422.1 |

OTHER PUBLICATIONS

Hybrid Memory Cube Consortium, "Hybrid Memory Cube Specification 1.0," Technical Specification, 122 pages, Apr. 2013.

* cited by examiner

*Primary Examiner* — Alex Skripnikov
(74) *Attorney, Agent, or Firm* — Polansky & Associates, P.L.L.C.; Paul J. Polansky

(57) ABSTRACT

A communication device includes a data source that generates data for transmission over a bus, and a data encoder that receives and encodes outgoing data. An encoder system receives outgoing data from a data source and stores the outgoing data in a first queue. An encoder encodes outgoing data with a header type that is based upon a header type indication from a controller and stores the encoded data that may be a packet or a data word with at least one layered header in a second queue for transmission. The device is configured to receive at a payload extractor, a packet protocol change command from the controller and to remove the encoded data and to re-encode the data to create a re-encoded data packet and placing the re-encoded data packet in the second queue for transmission.

20 Claims, 5 Drawing Sheets

MULTI-PROTOCOL HEADER GENERATION SYSTEM

STATEMENT REGARDING FEDERALLY SPONSORED RESEARCH OR DEVELOPMENT

This invention was made with United States government support under the FastForward-2 Memory Technology (MT) Project (Prime Contract No. DE-AC52-07NA27344, Subcontract No. B608045) awarded by the Lawrence Livermore National Laboratory. The United States government has certain rights in the invention.

FIELD OF THE DISCLOSURE

The present disclosure relates generally to integrated circuit and device communications, and more particularly to bus communication systems.

BACKGROUND

In the recent history of computer system advancements, a substantial issue to facilitate the progress of science and technology has been to establish compatibility between systems and devices developed by different organizations and even geographic locations worldwide. For this reason, there have been efforts to standardize certain communication interfaces and protocols so that independent parties can develop applications and systems that communicate with each other. Without such standardization efforts, technology such as World Wide Web data sharing and communications utilizing the Internet would not be possible.

As a part of these efforts, the Institute of Electrical and Electronic Engineers (IEEE) established a committee to develop communication protocol guidelines for computers so that every computer could communicate with every other computer. Accordingly, an Open Systems Interconnection (OSI) model was developed so that computer systems employing very different technologies can communicate with each other. The OSI model characterizes and standardizes communication functions by utilizing abstraction layers. More specifically, the original OSI model defined seven layers of abstraction that includes a physical layer (PHY) at the lowest level and an application layer at the highest level. In general, an OSI model data packet header includes a header portion that corresponds to each of the seven layers.

The transmission control protocol (TCP) and the Internet protocol (IP) are two network standards that support Internet-based routing and data flow. Essentially, TCP/IP defines how computers may communicate to each other over a routed and interconnected set of networks and network nodes. Accordingly, header systems for data packets often also include TCP/IP header fields that include routing information.

The OSI and TCP/IP network stacks are examples of complex vertically layered protocols that result in headers and tails (or portions thereof) being separately added to a data message via independent processes that correspond to the associated layers. Accordingly, these header portions or headers are not changed at runtime.

Dynamic random-access memory (DRAM) memory standards define fixed standards for communicating with standard DRAM memory devices using low-level commands but are not compatible with emerging Non-volatile random-access memory (NVRAM) timings or processing-in-memory usage. The Hybrid Memory Cube specification defines a fixed packet-based protocol for communication with 3D-stacked memory devices but lacks functionality for processing-in-memory uses. Accordingly, the different communication protocols and associated headers are not optimally suited for every application or communication. Using the OSI model or TCI/IP protocol stacks or other protocols may not be optimal for accessing various types of memory systems or for communications that related to a specific function or application.

BRIEF DESCRIPTION OF THE DRAWINGS

The present disclosure may be better understood, and its numerous features and advantages made apparent to those skilled in the art by referencing the accompanying drawings, in which.

The use of the same reference symbols in different drawings indicates similar or identical items. Unless otherwise noted, the word "coupled" and its associated verb forms include both direct connection and indirect electrical connection by means known in the art, and unless otherwise noted any description of direct connection implies alternate embodiments using suitable forms of indirect electrical connection as well.

DETAILED DESCRIPTION

Figure 1:
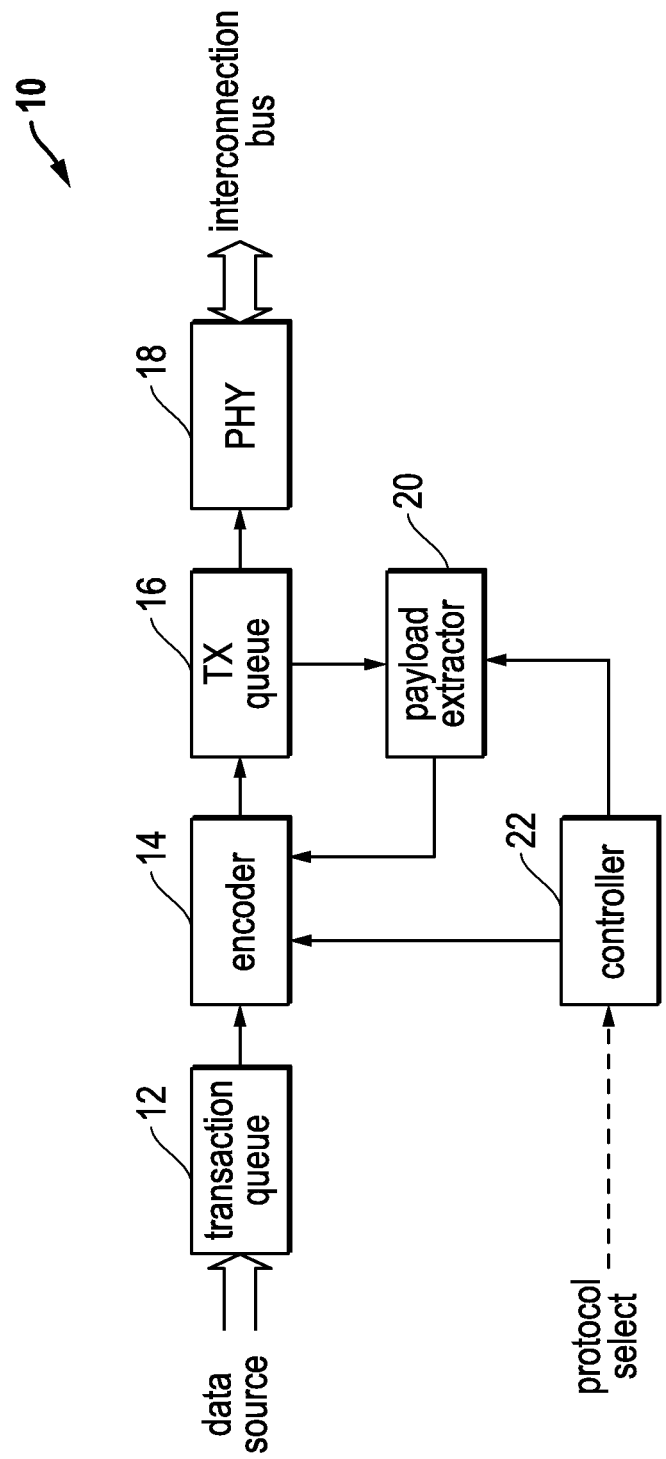
FIG. 1 is a functional block diagram of a communication system that supports a multi-protocol header encoding according to one embodiment.

FIG. 1 is a functional block diagram of a communication device in a communication system that supports a multi-protocol header encoding according to one embodiment. As may be seen, a transaction queue receives outgoing data for transmission from a data source. An encoder 14 receives the outgoing data from the transaction queue 12 and an encoding control command from controller 22. Encoder 14 delivers a encoded data to transmission queue 16. The encoded data may be a data packet with at least one header or header portion and a tail or it may be a data word with one or more layered headers and a tail. For simplicity, the encoded data shall be referenced herein as an encoded data packet.

Transmission queue 16 delivers the encoded data packet to physical layer (PHY) 18 that is configured to produce the encoded data packet onto an interconnection bus. Transmission queue 16 also produces the encoded data to a payload extractor 20 in response to payload extractor 20 receiving a packet protocol change command from controller 22. Payload extractor 20 produces an extracted payload to encoder 14 to be re-encoded with a new protocol header.

In operation, transaction queue 12 receives outgoing data from a data source and produces the outgoing data to encoder 14. Encoder 14 encodes the outgoing data with layered headers and a format according to a currently selected protocol as indicated by controller 22. The outgoing encoded data, which could comprise a data packet, is then produced to a transmission queue 16 for delivery to the physical layer 18 for transmission over the interconnection bus. For a variety of different reasons, a controller 22 may generate a command to change the communication protocol and therefore the associated format for the outgoing data packets. Accordingly, upon receiving a packet protocol change command from controller 22, payload extractor 20 retrieves the stored outgoing data packets, or encoded data, from transmission queue 16 to extract the payload or data. The extracted payload is then produced to encoder 14 that re-encodes the payload or outgoing data according to the new protocol specified by controller 22.

As shown in FIG. 1, controller 22 receives a protocol select signal that may be used to define any one of a plurality of protocols that are to be used for outgoing data packets. A change in values of the protocol select signal that is received by controller 22 prompts controller 22 to generate the packet protocol change command to both encoder 14 and payload extractor 20. It should also be noted that, in one embodiment, any re-encoded data packets or data are placed within transmission queue 16 ahead of any data received by transaction queue 12 whenever the packet protocol change command is issued or produced by controller 22. Thereafter, data within transaction queue 12 is encoded with header information according to the most recently specified protocol. Generally, the data is encoded according to a selected protocol. This includes header formats (e.g., layered headers and the various types of layering) as well as encoding for the tail and other formatting requirements.

Figure 2:
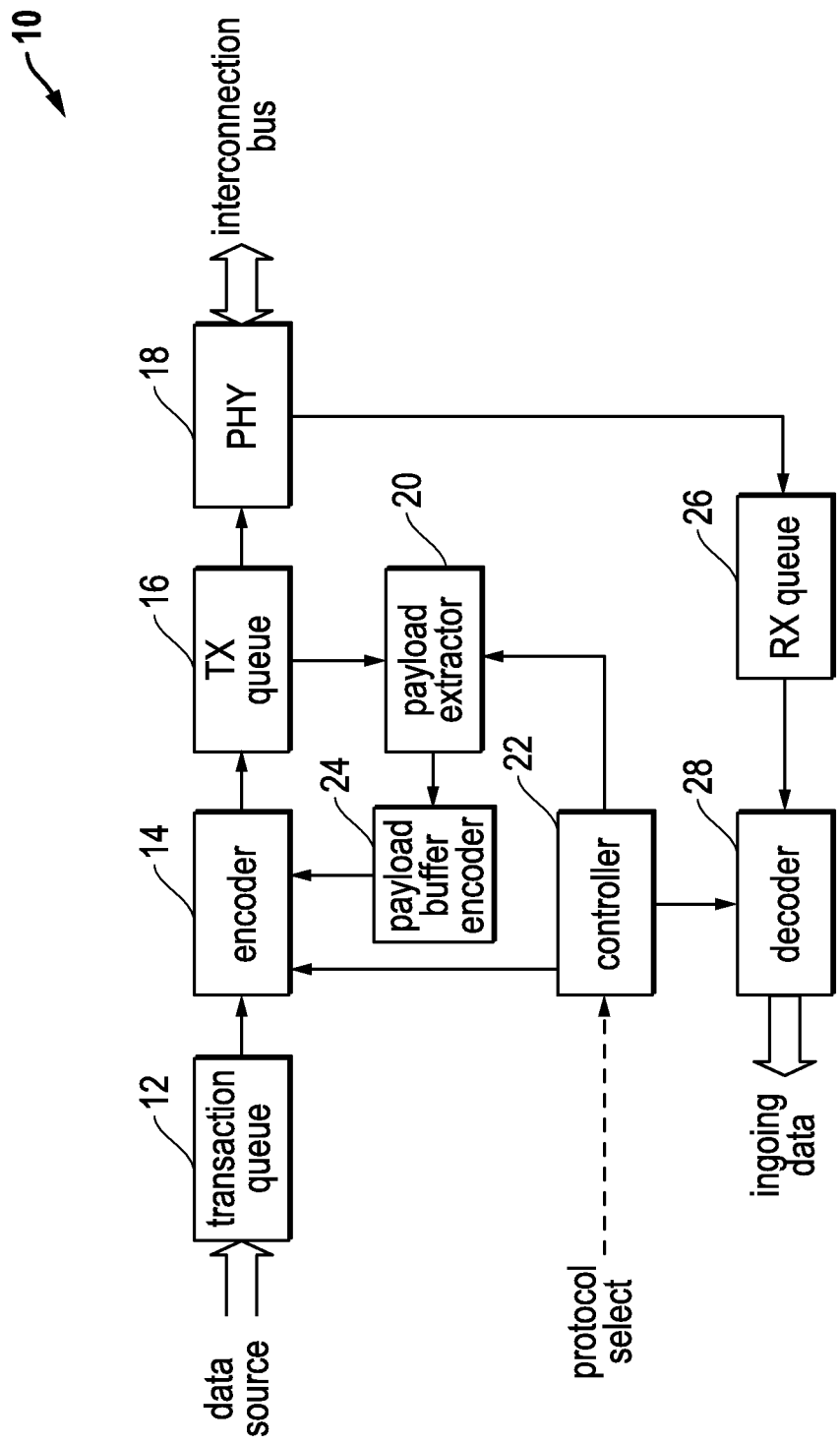
FIG. 2 is a functional block diagram of a communication system that supports a multi-protocol header encoding according to one embodiment.

FIG. 2 is a functional block diagram of a communication system that supports a multi-protocol header encoding according to one embodiment. As may be seen, transaction queue 12 receives data for transmission from a data source. An encoder 14 receives the outgoing data from the transaction queue 12 and receives an encoding control command from a controller 22. Encoder 14 delivers an encoded data packet to transmission queue 16. Transmission queue 16 delivers an encoded data packet to physical layer circuitry (PHY) 18 that is configured to produce the encoded data packet onto an interconnection bus.

Transmission queue 16 produces the encoded data packet to a payload extractor 20. Payload extractor 20 receives a packet protocol change command from controller 22. Payload extractor 20 produces an extracted payload to encoder 14 to be re-encoded with a new protocol header via payload buffer encoder 24 as described below. Payload extractor 20 produces the extracted payload to a payload buffer encoder 24 that encodes or inserts a payload buffer. The output of payload buffer encoder 24 is then produced to encoder 14 when the payload is re-encoded as an outgoing data packet.

Additionally, as may be seen, the physical layer circuitry, namely PHY 18, delivers received data packets from the interconnection bus to receive (RX) queue 26. RX queue 26 delivers received packets to decoder 28 that decodes the received packets according to a specified protocol. In one embodiment, controller 22 produces the specified protocol indication to decoder 28. In an alternative embodiment, the received data packet includes an indication of the protocol that was used to encode the packet. Accordingly, decoder 28 extracts the data by decoding according to the indicated protocol.

In operation, transaction queue 12 receives outgoing data from a data source and produces the outgoing data to encoder 14. Encoder 14 encodes the data with layered headers according to a currently selected protocol as indicated by controller 22. The outgoing data with the layered headers, which could comprise a data packet, is then produced to a transmission queue 16 for delivery to the physical layer circuitry PHY 18 for transmission over the interconnection bus. For a variety of different reasons, a controller 22 may generate a command to change the communication protocol and therefore the associated header for the outgoing data packets.

Accordingly, upon receiving a packet protocol change command from controller 22, payload extractor 20 retrieves the stored outgoing data packets, or data with layered headers, from transmission queue 16 to extract the payload or data. The extracted payload is then produced payload buffer encoder 24 which produces a payload with an encoded buffer to encoder 14 that re-encodes the payload or outgoing data according to the new protocol specified by controller 22 to recreate the outgoing data packets. Payload buffer encoder 24 is optional and may be excluded according to design preference and implementation (as shown in FIG. 1). In such a case, payload extractor 20 delivers the extracted payload directly to encoder 14 for re-encoding.

As shown in FIG. 2, controller 22 receives a protocol select signal that may be used to define any one of a plurality of protocols that are to be used for outgoing data. A change in values of the protocol select signal that is received by controller 22 prompts controller 22 to generate the packet protocol change command to both encoders 14 and payload extractor 20. It should also be noted that, in one embodiment, any re-encoded packets or data with layered headers and other formatting changes according to the new protocol are placed within transmission queue 16 ahead of any data received by transaction queue 12 whenever the packet protocol change command is issued or produced by controller 22. Thereafter, data within transaction queue 12 is encoded with header information according to the most recently specified protocol.

As may also be seen in FIG. 2, PHY 18 produces received data packets to RX queue 26 that, in turn, produces the received data packets to decoder 28 to decode the data or data packets to produce in-going data. Decoder 28, because a multiprotocol system is being used, decodes the data according to a protocol indication provided by controller 22, or alternatively, as specified in the received data packet. Furthermore, if two circuits similar to what is shown in FIG. 2 are communicating over the interconnection bus, then a communication system that supports full duplex communications utilizing the multiprotocol encoding systems described herein may be implemented.

Figure 3:
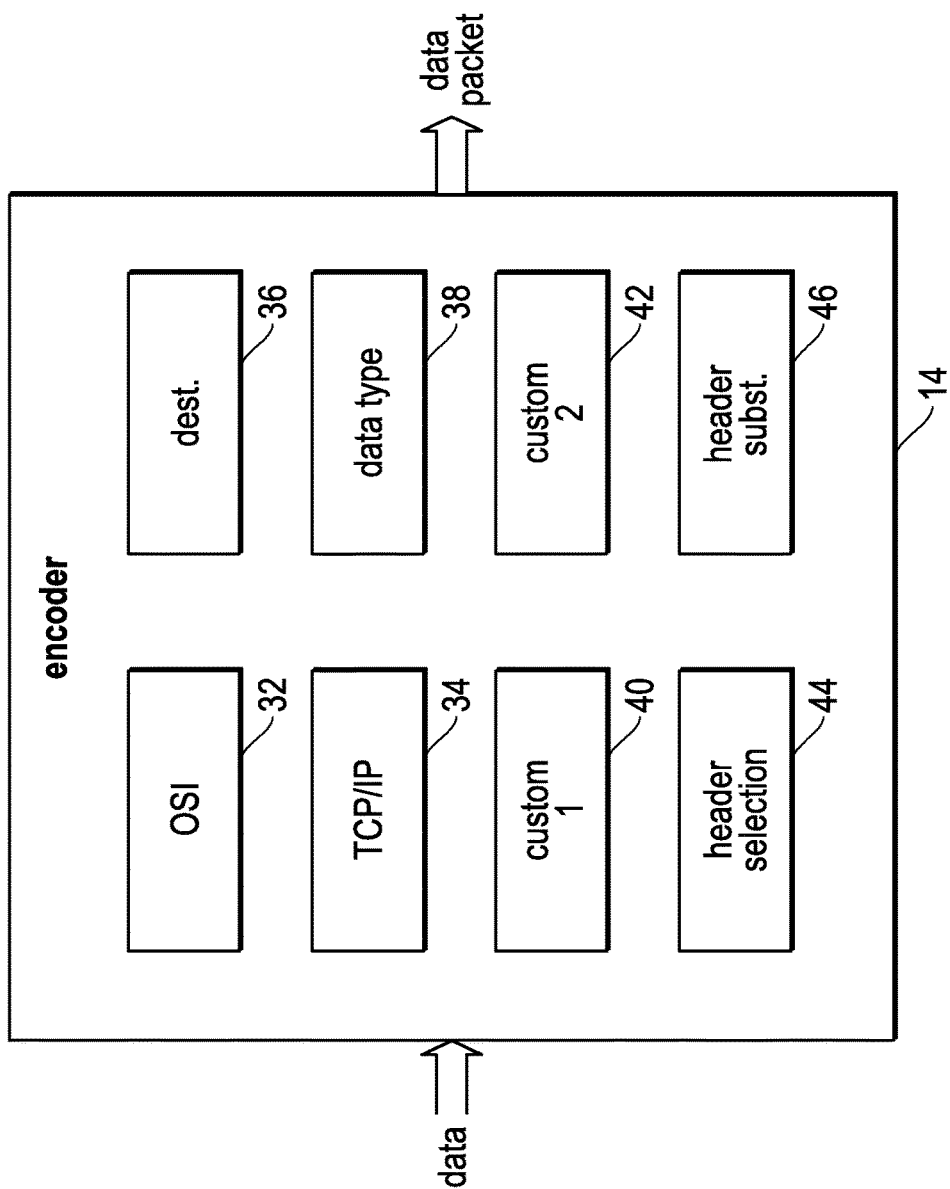
FIG. 3 is a functional block diagram of an encoder system according to one embodiment.

FIG. 3 is a functional block diagram of an encoder system according to one embodiment. Referring to FIG. 3, an encoder 14 includes a plurality of blocks including an OSI block 32 that is configured to produce header information according to the OSI model described above. It should be understood that not all of the blocks shown in FIG. 3 are required according to the various embodiments of the invention. In one embodiment, OSI block 32 is configured to produce a header that includes a data link portion, a network portion, a transport portion, a session portion, a presentation portion, and an application portion. For receive functionality, each of these header portions are processed and removed in a reverse order. Accordingly, the application portion is processed first and, thereafter, in order, the presentation portion, the session portion, the transport portion, the network portion, and finally the data link portion are processed. Thereafter, the physical data is extracted and processed.

Encoder 14 also includes a TCP/IP block 34 for encoding data according to the TCP/IP protocol. Typically, the TCP/IP protocol suite includes four layers. The network interface layer is responsible for arranging the IP datagrams to be passed to a physical network interface. This task includes mapping IP addresses to physical addresses. An Internet layer corresponds to router information to forward packets from one network to another. The transport layer includes transport control protocol information and/or user datagram protocol information. This allows a datagram (data or data word) to be delivered from one program to another. Finally, the application layer does not deal with session or presentation layers. The operating system typically responds to the transport layer. Each of these four layers includes associated headers that are stacked onto the data in the order described in a manner similar to the OSI model header information. Upon receipt of a packet with headers formed according to the TCP/IP protocol, the headers are processed and removed sequentially in the reverse order similarly to what was described above for the OSI model.

Encoder 14 also includes a destination block 36 that creates header information particular to a specified destination. Encoder 14 also includes a header-processing block shown as data type block 38 that generates headers according to a data type. Additionally, encoder 14 includes two custom header blocks 40 and 42, respectively, for generating custom headers for specified applications. Encoder 14 also includes a header selection block 44 that defines the logic for managing and selecting which header type is to be used for a particular datagram. Finally, encoder 14 includes a header substitution block 46 that defines logic for substituting headers in a manner as described before whenever a packet protocol change command from controller 22 is received.

Figure 4:
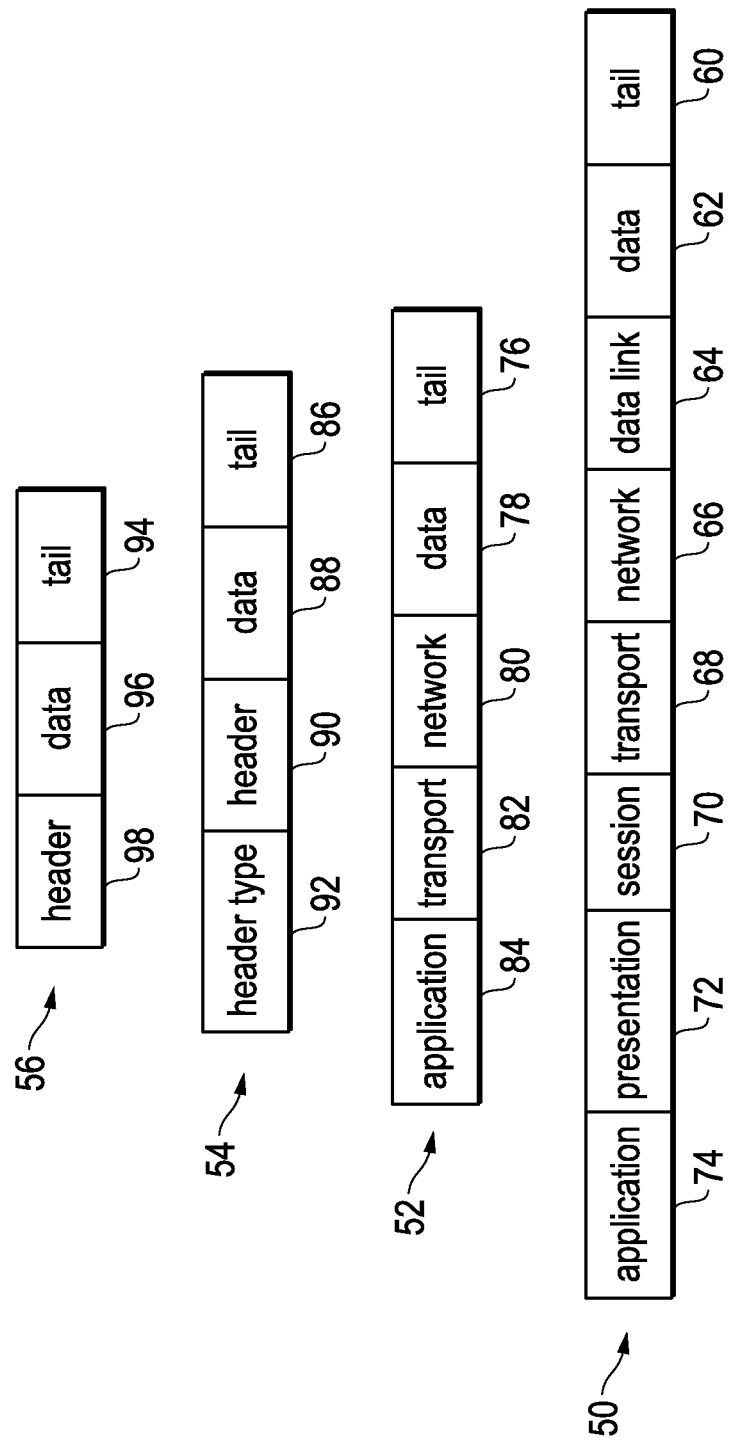
FIG. 4 is a functional diagram that illustrates a plurality of packets that represent operation of the encoding system and a method therefor according to one embodiment.

FIG. 4 is a functional diagram that illustrates a plurality of packets that represent operation of the encoding system and a method therefor according to one embodiment. Referring to FIG. 4, a signal 50 includes a tail 60, data 62, a data link header portion 64, a network header portion 66, a transport header portion 68, a session header portion 70, a presentation header portion 72, and an application header portion 74. As may be gathered, signal 50 includes a signal with headers formed according to the OSI model protocol.

A signal 52 includes a tail 76, data 78, a network header portion 80, a transport header portion 82, and an application header portion 84. Signal 52 is formed according to a TCP/IP protocol. FIG. 4 also includes signals 54 and 56 that illustrate other header types with even less information. These header types may comprise custom header types that are designed for a particular destination, data type, or application. For example, signal 54 includes a tail 86, data 88, a header portion 90, and a header protocol type portion 92. Signal 56 is even simpler and includes a tail 94, data 96 and a header 98.

One aspect of the embodiment is that the multi-protocol header system is configurable to selectively switch between the plurality of header protocols or configurations as necessary including during run time operations and to repackage outgoing data according to a newly specified or selected protocol. For example, if a more complicated protocol is not necessary based on the transmission destination or data type, then the use of simpler or reduced headers improves transmission speed and throughput and reduces power consumption. Accordingly, a packet protocol change command may be generated to realize the performance improvement. Generally, there are many different types of protocols that may be implemented for a communication of data. Some of the types listed are for example. The embodiments are not limited merely to the types of protocols and header layering described herein. Other types of protocols that may be used by an encoder system according to an embodiment include Peripheral Component Interconnect Express (PCIe), computer networking standards such as Infiniband, Asynchronous Transfer Mode (ATM), Ethernet, RapidIO, Fibre Channel, Universal Serial Bus (USB), HyperTransport, Quick Path Interconnect (QPI), and Hybrid Memory Code (HMC) among others not listed here.

Figure 5:
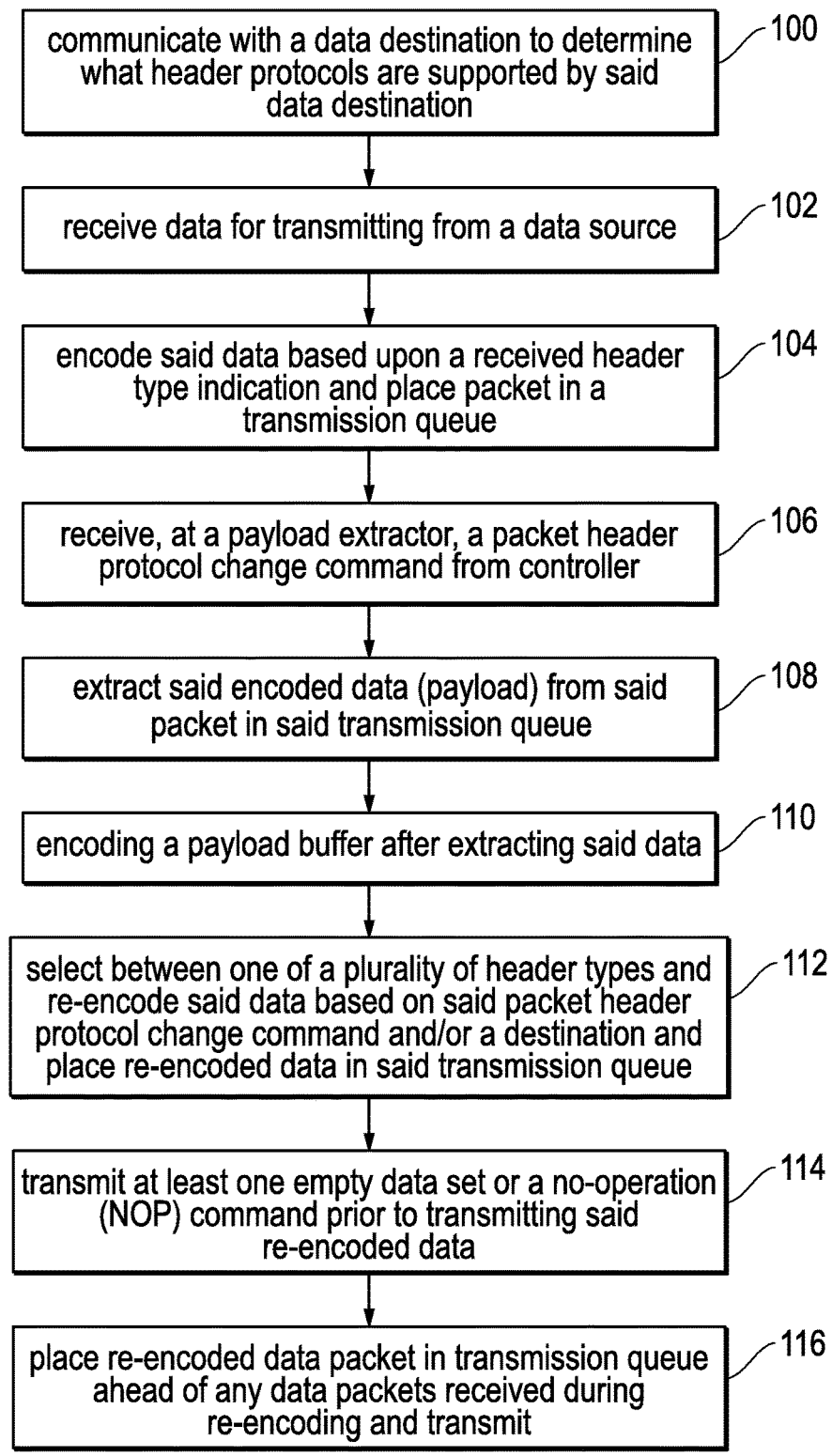
FIG. 5 is a method according to one embodiment for an encoder system.

FIG. 5 is a method according to one embodiment for an encoder system. The method commences with an encoder system communicating with a data destination to determine what header protocols are supported by the data destination (100). Alternatively, the protocol capabilities of the destination may be user specified and stored within a table or memory of the encoder system. Thereafter, the method includes receiving outgoing data that is to be transmitted to a data destination (102). The outgoing data may be received from a data source including a memory, a processor, a radio receiver, etc. The term "outgoing data" is in relation to the encoding system described here and could actually be data that has been received from an external source for processing and may be ingoing in relation to the overall circuit, system or device. The data is outgoing relative to the encoder system and data that is to be produced for transmission on a bus. As shown in prior figures, the outgoing data is stored in a transaction queue in one embodiment. Thereafter, the method includes encoding the outgoing data as it is received from the transaction queue based upon a received header type indication and placing the packet or data with layered headers into a transmission queue (104).

As previously described for in relation to FIGS. 1 and 2, the outgoing data packets, or data with encapsulated headers, that are stored in the transmission queue 16 are then delivered to PHY 18 for transmission over the interconnection bus during normal operations. During such normal operations, the method includes receiving, at a payload extractor, a packet protocol change command from a controller (106). In response to the received packet protocol change command, the method includes the payload extractor retrieving at least one data packet, or data with encapsulated headers, from the transmission queue and removing the encoded data (payload) from the packet or data with encapsulated headers (108).

After extracting the data, the method includes, optionally, encoding a payload buffer (110). The method also includes selecting between one of a plurality of header types and re-encoding the extracted data based upon the packet protocol change command and/or a destination and placing the re-encoded data packet in the transmission queue (112). The method optionally includes transmitting at least one empty data set or a no operation (NOP) command prior to transmitting the re-encoded data (114). In the described embodiment, the re-encoded data is then placed back into the transmission queue ahead of any data packets or data with encapsulated headers for data that was received and stored in the transaction queue subsequent to the payload extractor receiving the packet protocol change command (116).

The above-disclosed subject matter is to be considered illustrative, and not restrictive, and the appended claims are intended to cover all such modifications, enhancements, and other embodiments that fall within the true scope of the claims Additionally, the blocks and circuit elements may be implemented with various combinations of hardware and software, and the software component may be stored in a computer readable storage medium for execution by at least one processor. Moreover the method illustrated in FIG. 5 may also be governed by instructions that are stored in a computer readable storage medium and that are executed by at least one processor. Each of the operations shown in FIG. 5 may correspond to instructions stored in a non-transitory computer memory or computer readable storage medium including processing-in-memory, cache coherence and virtual memory support. In various embodiments, the non-transitory computer readable storage medium includes a magnetic or optical disk storage device, solid-state storage devices such as Flash memory, or other non-volatile memory device or devices. The computer readable instructions stored on the non-transitory computer readable storage medium may be in source code, assembly language code, object code, or other instruction format that is interpreted and/or executable by one or more processors.

Moreover, integrated circuits used to implement portions of the communication devices described above may be described or represented at least in part by a computer accessible data structure in the form of a database or other data structure, which can be read by a program and used, directly or indirectly, to fabricate the integrated circuit that includes an encoder or decoder or system as, described herein. For example, this data structure may be a behavioral-level description or register-transfer level (RTL) description of the hardware functionality in a high level design language (HDL) such as Verilog or VHDL. The description may be read by a synthesis tool that may synthesize the description to produce a netlist comprising a list of gates from a synthesis library. The netlist comprises a set of gates that also represent the functionality of the hardware comprising an integrated circuit. The netlist may then be placed and routed to produce a data set describing geometric shapes to be applied to masks. The masks may then be used in various semiconductor fabrication steps to produce an integrated circuit. Alternatively, the database on the computer accessible storage medium may be the netlist (with or without the synthesis library) or the data set, as desired, or Graphic Data System (GDS) II data.

Thus, to the maximum extent allowed by law, the scope of the present invention is to be determined by the broadest permissible interpretation of the following claims and their equivalents, and shall not be restricted or limited by the foregoing detailed description.

What is claimed is:

1. A method for transmitting a packet, comprising:
receiving outgoing data from a data source for transmitting and storing said outgoing data in a first queue;
in an encoder, receiving said outgoing data from said first queue and a protocol indication from a controller;
encoding said outgoing data based upon said protocol indication to create a packet including encoded data and placing said packet in a second queue;
receiving, at a payload extractor, a packet protocol change command from said controller;
based upon said packet protocol change command, removing said encoded data from said packet in said second queue and extracting said outgoing data; and
re-encoding said outgoing data based on said packet protocol change command to create a re-encoded data packet and placing said re-encoded data packet in said second queue.

2. The method of claim 1 further comprising encoding a payload buffer after extracting said outgoing data.

3. The method of claim 1 further comprising transmitting one of an empty data set and at least one no-operation (NOP) command to a receiver prior to transmitting said re-encoded data packet.

4. The method of claim 1 wherein said encoding and re-encoding includes selecting between one of a plurality of protocol formats comprises selecting an Open Systems Interconnection (OSI) model protocol reflecting OSI processing layers.

5. The method of claim 1 wherein said encoding and re-encoding includes selecting between one of a plurality of protocol formats comprises selecting a Transmission Control Protocol/Internet Protocol (TCP/IP) reflecting TCP/IP processing layers.

6. The method of claim 1 wherein said encoding and re-encoding includes determining to re-encode said outgoing data based upon a destination for said outgoing data.

7. The method of claim 1 wherein said encoding and re-encoding includes selecting between one of a plurality of protocols based on a received protocol indication either with a received signal or from said controller.

8. The method of claim 1 wherein said encoding and re-encoding includes selecting between one of a plurality of protocols comprises selecting one of:
a light weight protocol for supporting basic operations;
a medium weight protocol for supporting timing and sequencing support; and
a heavy weight protocol that supports processing-in-memory, cache coherence and virtual memory support for memory networks.

9. The method of claim 8 where said light weight protocol corresponds to Dynamic Random Access Memory (DRAM) memory operations.

10. The method of claim 1 further comprising communicating with a data destination to determine what header protocols are supported by said data destination.

11. A reconfigurable bus interface, comprising:
a first queue for storing outgoing data;
an encoder configured to encode said outgoing data to produce an outgoing data packet based upon a received first protocol type indication;
a second queue for storing said outgoing data packet prior to transmission;
a payload extractor configured to receive said outgoing data packet from said second queue and to remove said outgoing data from said outgoing data packet; and
wherein said encoder is further configured to receive said outgoing data removed from said outgoing data packet and to re-encode said outgoing data according a received second protocol indication to create a re-encoded data packet.

12. The reconfigurable bus interface of claim 11 further comprising a controller that produces an indication of a protocol change to the encoder.

13. The reconfigurable bus interface of claim 12 wherein the controller produces a packet protocol change command to said payload extractor to prompt said payload extractor to remove at least one outgoing data packet from said second queue.

14. The reconfigurable bus interface of claim 12 further comprising a payload buffer encoder operably disposed between said payload extractor and said encoder, said payload buffer encoder configured to encode a buffer of a data payload.

15. The reconfigurable bus interface of claim 12 wherein said encoder is configured to place re-encoded outgoing data packets ahead in said second queue of any data packets for that data that was received since receiving said indication of a protocol change indication.

16. The reconfigurable bus interface of claim 12 wherein said encoder is configured to encapsulate said data to create said outgoing data packet with at least one of:
   a TCP/IP protocol;
   an OSI model protocol;
   a simplified memory access protocol; and
   a custom protocol indication.

17. A reconfigurable bus interface system, comprising:
   a communication bus; and
   a pair of communication devices configured to communicate with each other over said communication bus, each of the pair of communication devices further including:
      a first queue for storing outgoing data;
      an encoder configured to encode said outgoing data to produce an outgoing data packet based upon a received first protocol indication;
      a second queue for storing said outgoing data packet prior to transmission;
      a payload extractor configured to remove said outgoing data packet from said second queue and to remove said outgoing data from said outgoing data packet; and
      wherein said encoder is further configured to receive said outgoing data removed from said outgoing data packet and to re-encode said outgoing data according a received second protocol indication to create a re-encoded data packet;
      a third queue for storing an ingoing data packet; and
      a decoder configured to decode said ingoing data packet based upon a indication of a type of header encoding protocol for said ingoing data packet.

18. The reconfigurable bus interface system of claim 17 further comprising a controller wherein said controller produces a packet protocol change command to said payload extractor to prompt said payload extractor to remove said outgoing data packet from said second queue.

19. The reconfigurable bus interface system of claim 17 wherein said encoder is configured to encapsulate said outgoing data to create said outgoing data packet according to at least one of:
   a TCP/IP protocol;
   an OSI model protocol;
   a simplified memory access protocol; and
   a custom protocol.

20. The reconfigurable bus interface system of claim 17 wherein said encoder is configured to encapsulate said outgoing data to create said outgoing data packet with a protocol type indication and wherein said decoder is configured to decode said ingoing data packet based upon a received protocol type indication to support transmission and reception of data packets with differing types of headers.

* * * * *